United States Patent [19] [11] 4,126,939

Pyne, Jr. [45] Nov. 28, 1978

[54] REMOTE-CONTROLLED TABLE

[75] Inventor: Charles J. Pyne, Jr., Littleton, Colo.

[73] Assignee: P.P.B. Enterprises, Denver, Colo.

[21] Appl. No.: 721,894

[22] Filed: Sep. 9, 1976

[51] Int. Cl.[2] .......... A61C 19/02
[52] U.S. Cl. .......... 32/22
[58] Field of Search .......... 269/322-327, 269/328; 211/60 T; 248/405, 425, 296; 108/147, 138, 141; 32/22

[56] References Cited

U.S. PATENT DOCUMENTS

| | | | |
|---|---|---|---|
| 2,219,844 | 10/1940 | Lotter et al. | 248/157 |
| 2,708,899 | 5/1955 | Rudolph | 108/141 |
| 2,991,138 | 7/1961 | Freeman | 108/141 |
| 3,271,859 | 9/1966 | Horowitz et al. | 108/138 |
| 3,288,090 | 11/1966 | King | 108/20 |
| 3,304,609 | 2/1967 | Horowitz et al. | 32/22 |
| 3,348,799 | 10/1967 | Junkel et al. | 108/141 |
| 3,608,462 | 9/1971 | Groshong et al. | 108/141 |
| 3,880,096 | 4/1975 | Kaplan | 248/405 |

*Primary Examiner*—Robert Peshock
*Attorney, Agent, or Firm*—James R. Young; John E. Reilly

[57] ABSTRACT

A dental appliance stand is provided with an equipment tray and remote-controlled positioning means for simultaneously rotating and vertically advancing the tray between an out-of-the-way position to one side of the patient chair and a use position directly over the patient chair. The positioning means includes a rotatable worm screw with a worm follower for imparting vertical movement to the tray and a guide cylinder with an elongated guide slot, a section of which has a helical pattern, for engagement with a guide pin extending radially from the worm follower to impart rotational movement to the tray. The worm screw is driven by an electric motor through a clutch mechanism to prevent jamming of components or burning of the motor or belts, and the tray is attached to the positioning means by a leveler mechanism which can be adjusted both to level the tray and to provide a safety slip engagement between the positioning means and the tray to prevent injuries in case a person should inadvertently get into the path of the tray while it is in operation.

12 Claims, 9 Drawing Figures

REMOTE-CONTROLLED TABLE

BACKGROUND OF THE INVENTION

This invention is generally related to remote-controlled tables, and more specifically to a remote-controlled dental table or tray which can be automatically positioned in a convenient location for use by a dentist while working on his patient.

It is commonly known that dentists can most conveniently work on their patients' teeth with the patient in a reclining or semi-reclining position. Most dentists have patient chairs suitably designed for conveniently and comfortably placing the patient in this position. It is also quite commonly known that dentist work requires a myriad of equipment, appliances, pads and other supplies, and most dentists prefer to have these items located in a convenient place near the patient's head where they can be reached easily and quickly. One of the most convenient for these items is in spaced relation over the patient's chest.

A variety of prior art devices have been developed in an effort to provide tables or trays for holding the dentist's equipment or supplies in this convenient location and which can be adjusted to the most convenient position as well as moved to an out-of-the-way position to allow more convenient access to the patient's chair when the patient is first getting into position on the chair and also when the patient leaves the chair. One such notable invention is disclosed in U.S. Pat. No. 3,348,799, issued to W. Junkel, et al.

Still other inventions have been made for moving the table or tray to and from a convenient working position automatically by remote control for convenience of the dentist, both to limit the physical movement and stretching required to place manual trays in position and to save time. U.S. Pat. Nos. 3,271,859 and 3,304,609 issued to N. Horowitz et al. exemplify such developments.

While all of these prior art efforts have been successful to some extent in accomplishing their desired goals, they still have not achieved a remote-controlled dental tray apparatus which can be transferred between an out-of-the-way position and a use position over the patient's chair through simultaneous rotational and vertical movement with no manual effort required other than to operate the remote control switch, and which can operate with a simple, single drive apparatus which is both relatively reliable and inexpensive to manufacture.

SUMMARY OF THE INVENTION

It is an object of the present invention to provide a novel and improved dental equipment stand with a remote-controlled apparatus to automatically move a dental tray between an out-of-the-way position adjacent the patient's chair and a work position directly over the patient's chair.

It is also an object of this invention to provide apparatus whereby a dental equipment tray can be simultaneously rotated and moved vertically between a location above and to one side of the chair to a lower location directly over the chair.

It is still another object of the invention to provide a dental equipment tray which can be remotely controlled to be adjustably moved vertically while in a position directly over the patient's chair.

It is a further object of the present invention to provide remote-controlled common drive means for a dental tray whereby the tray can be rotated and moved vertically between an out-of-the-way position above and to the side of the patient's chair to a position directly over the patient's chair and which can be adjusted vertically to the desired level over the patient's chest; and further wherein said drive means is capable of moving the tray as described above and is equipped with clutch means to prevent jamming or damage when the tray reaches the maximum limits of travel.

It is still another object of the present invention to provide a drive means which can be conveniently altered to provide different operating ranges and patterns of travel for the equipment tray.

Accordingly, the present invention comprises a dental tray and positioning means for positioning the tray in a desired location by the dentist by remote control. The positioning means preferably includes a worm screw with a corresponding worm follower for imparting vertical movement to a cylindrical tray supporting member, and it includes a stationary cylinder in surrounding relation to the worm follower with a strategically located and appropriately configurated guide slot in the stationary sleeve. A guide pin rigidly extending radially from the worm follower engages the guide slot for imparting rotational movement to the support cylinder simultaneous with the vertical movement.

The positioning means is mounted on any appropriate dental equipment or appliance stand, and the equipment tray is attached to the support cylinder with an adjustable leveling device for leveling the equipment tray.

A drive means is provided to rotate the worm screw, including an electrical motor, appropriate drive and reduction pulleys, and a clutch assembly.

In the preferred embodiment, the equipment tray is positioned in an out-of-the-way position above and to the side of the patient's chair. When the drive means is activated by remote control, the tray moves through a helical path traveling simultaneous downward and rotating approximately 90° to position directly over the patient's chair. Further operation of the motor in the same direction results in continuous vertical movement downward but with no further rotational movement to allow the dentist to adjust the height of the tray over the patient to a location that is convenient for his use as well as to accommodate persons of different sizes. When the dentist has completed his work on the patient, the motor can be remotely activated in the reverse direction thereby moving the tray upward and then through a reverse helical path traveling simultaneously upward and rotating through 90° to the out-of-the-way position from which it started. When the tray reaches its maximum travel range limits, the clutch in the drive means will slip to prevent damage or burning of the motor or drive belts.

BRIEF DESCRIPTION OF THE DRAWINGS

Other objects, advantages, and capabilities of the present invention will become more apparent as the description proceeds, as taken in conjunction with the accompanying drawings, in which.

DETAILED DESCRIPTION OF THE PREFERRED EMBODIMENT

Figure 1:
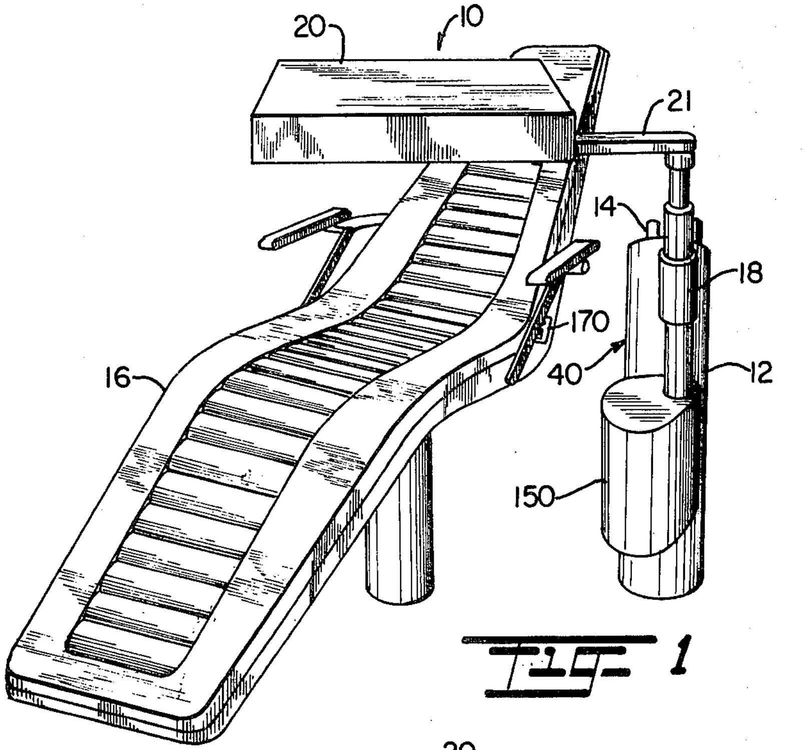
FIG. 1 is a perspective view of the invention with the dental tray in intermediate position of the helical path.
Figure 2:
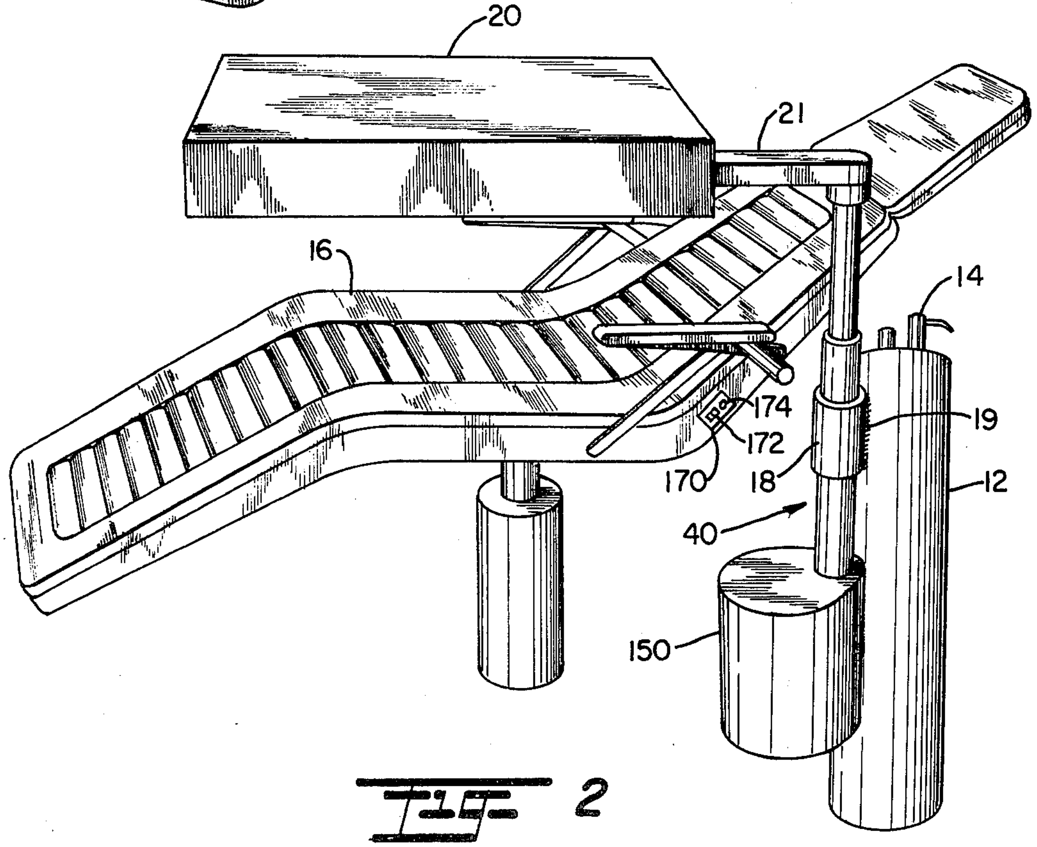
FIG. 2 is a side view of the invention with the dental tray in the out-of-the-way position upward and to the side of the patient's chair.

The preferred embodiment of the present invention is characterized by a remote-controlled tray apparatus, generally indicated at 10, which is mounted on a dental appliance stand 12 adjacent to a dental patient chair 16. The apparatus 10 includes a tray 20 with storage drawers 36 and is supported in a cantilever fashion by arm 21. The appliance stand generally contains various dental appliances such as drills, water valves, vacuum tubes, and the like generally indicated at 14.

Figure 3:
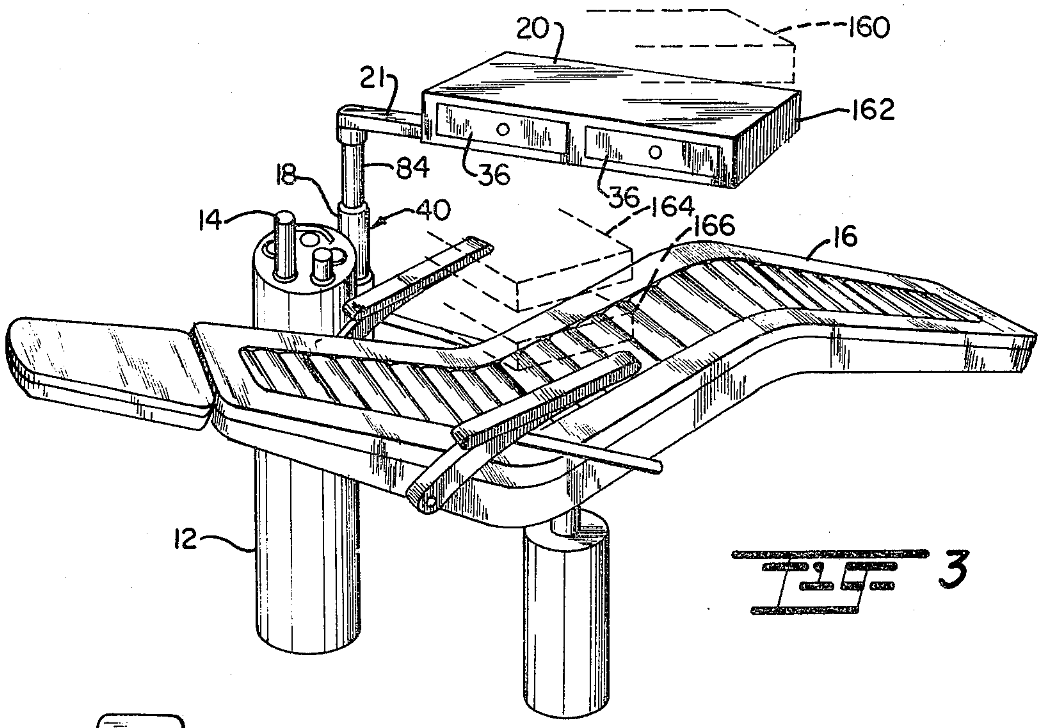
FIG. 3 is a view from the opposite side showing the dental tray intermediate in the helical path and also showing various other positions within the range of travel in phantom lines.
Figure 4:
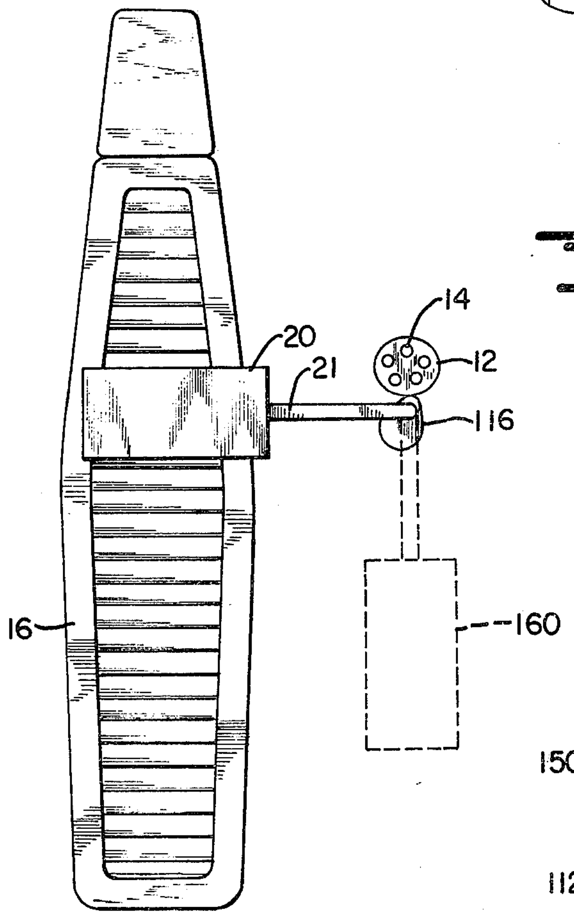
FIG. 4 is a plan view showing the dental tray in position directly over the patient's chair and also showing the out-of-the-way position of the table in phantom lines.

The arm is supported by rotatable and vertically movable positioning means 40 which is removably attached to the appliance stand 12 by a tubular bracket 18 rigidly affixed, such as, by welding to the appliance stand 12 as indicated at 19. The positioning means is operated by remote control and is capable of moving the tray 20 between an out-of-the-way position above and to the side of the patient's chair 16 and a position directly over the patient's chair 16, as best viewed in FIGS. 3 and 4. The out-of-the-way position above and to the side of the patient's chair 16, is indicated by the phantom lines 160. From that out-of-the-way position, the tray is movable in a generally helical path simultaneously lowering and rotating through the position indicated at 162 to a position directly over the patient's chair as indicated in phantom lines at 164. When directly over the patient's chair 16, the rotation of the tray 20 stops; however, continued operation of the positioning means results in vertically lowering the tray to a position indicated in phantom lines at 166. Reversal of the positioning means results in movement of the tray 20 in a reverse direction through the positions indicated above to the out-of-the-way position indicated at 160.

Figure 5:
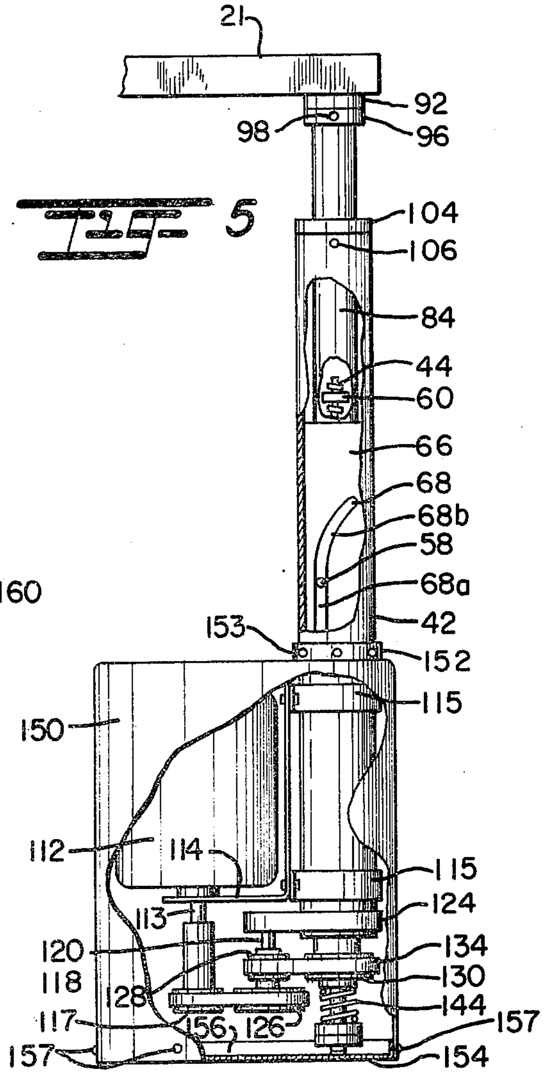
FIG. 5 is an enlarged view of the drive and lifting mechanism with portions cut away to reveal the structures and spacial relationships of internal parts.
Figures 6, 7:
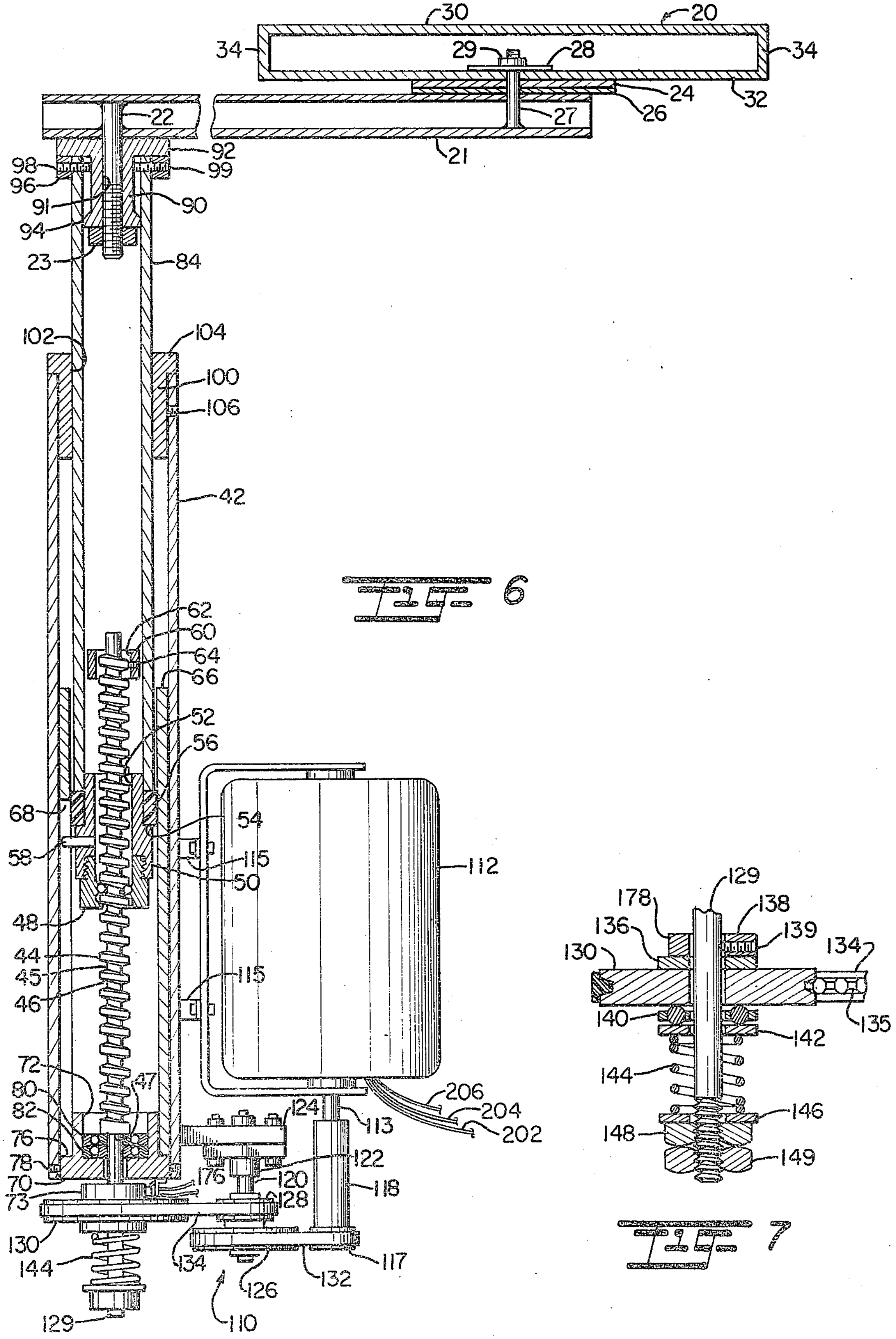
FIG. 6 is an enlarged cross-sectional view of the lift mechanism.
FIG. 7 is a still further enlarged cross-sectional view of the clutch mechanism.

One significant feature of the present invention resides in the positioning means 40. As best seen in FIGS. 5 and 6, the positioning means is comprised of an outer housing or cylinder 42 with a smaller concentric support cylinder 84 slidably received within outer cylinder 42 whereby the support cylinder 84 is axially extendible from the contractable into, as well as rotatable within, the housing cylinder 84. The arm 21 of table 10 is mounted on and supported by the upper end of the support cylinder 84.

A rotatable drive is in the form of a worm or drive screw 44 with a ball bearing nut 48 threadedly attached to a sleeve-like worm follower 50 also positioned within housing cylinder 42 for imparting movement to support cylinder 84. The worm gear 44, which includes a central shaft 45 and helical flighting 46 is journaled and retained in position within the housing cylinder 42 by a bearing retainer 70 rigidly fastened in the bottom end of housing 42 by set screws 78. An axial bore 73 extends through the retainer 70 to accommodate passage of extension 129 of the worm shaft 45. A sleeve-like extension 72 of cylindrical configuration extends upwardly from the retainer 70 to provide a housing for the bearings 80 and 82 resulting in an inside shoulder 74 and an outside shoulder 76, respectively, on the inside and outside of the bearing housing 72. The bearings 80 and 82 rest on the inside should 74 of the retainer 70.

The lower extremity of the flighting 46 of worm screw 44 defines an annular thrust shoulder 47 which bears on and is supported by bearing 80. It can thus be appreciated that the worm screw shaft 45 is rotatable within and supported by the bearing retainer 70.

The ball bearing nut 48 is internally threaded to mate with and be engaged by the flighting 46 of worm screw 44, and it is threadedly received within a sleeve-like worm follower 50 with an axial bore 52 in outer spaced concentric relation to the worm screw 44. Rotation of the worm screw 44 imparts vertical movement to the worm follower 50 through the bearing nut 48.

A stationary guide cylinder or sleeve 66 is also positioned within housing cylinder 42 concentrically between housing cylinder 44 and support cylinder 48 so that it is in spaced-apart surrounding relation to the worm follower 50. The lower end of guide cylinder 66 is supported in stationary position by the outside shoulder 76 of bearing retainer 70. An annular Nylon bushing 56 is fitted around an upward extension of worm follower 50 and supported by an external shoulder 54 of worm follower 50. Bushing 56 is of sufficient thickness so that its outer peripheral surface is in concentric, sliding contact with the inside surface of guide sleeve 66, thereby maintaining the worm follower 50 and worm screw 44 in stable upright position while allowing vertical as well as rotational movement of the worm follower in relation to the guide sleeve 66. An upper vertical limit stop 60 in the form of an annular ring with an inside bore 62 is adjustably attached to the upper end of worm screw 44 by set screw 64. This limit stop 60 defines the upper limit of maximum vertical travel of the worm follower 50.

A guide slot 68 is formed in the cylindrical wall of guide sleeve 66, and a guide pin 58 is rigidly attached to the worm follower 50 to extend radially into the guide slot 68. The guide pin 58 in cooperation with the guide slot 68 performs essentially two functions: First, it resists rotational movement of worm follower 50 and bearing nut 48 in relation to the rotational movement of worm screw 44, thereby resulting in vertical movement of the worm follower 50; second, imparts partial rotation to the worm follower 50 corresponding with the configuration of the guide slot. It can be appreciated that any rotation of the worm screw 44 imparts vertical movement through the worm follower 50; therefore the configuratiion of the guide slot must always have a vertical component at any point along the length of the slot to accommodate vertical movement of the guide pin 50 without jamming.

The guide slot however does not have to be completely vertical. In fact, in the preferred embodiment, the upper portion of the guide slot extends in a partial helical or spiral pattern around the guide sleeve 66. This configuration can best be viewed in FIG. 5 wherein the guide slot 68 is depicted with a lower straight axial or vertical section 68*a* and an upper curved or helical section 68*b*. It can thus be appreciated that upward movement of the worm follower 50 with the guide pin 58 engaged in vertical section 68*a* of the guide slot 68 results in exclusively vertical or axial movement, and when the worm screw 44 drives the worm follower 50 with its guide pin 58 into the helical section 68*b* of guide slot 68, a simultaneous vertial and rotational movement defined by the angle of inclination of the guide slot 68 will be imparted to the worm follower 50. Of course, rotation of the worm screw 44 in the opposite direction results in corresponding rotational and vertical movement of the worm follower 50 in a reversed path. The upper limit stop 60 is preferably set to contact the worm follower 50 and thereby stop it prior to the guide pin 58 contacting the upper limit of the guide slot 68. This setting will prevent jamming, shearing, or loosening of the guide pin 58.

The lower end of support cylinder 84 is abutted against and supported by the annular Nylon bushing 56 of worm follower 50. Consequently, any vertical as well as rotational movement of the worm follower 50 resulting from the rotation of the worm screw 44 and the guide pin 58 engaged in the guide slot 68 will also be imparted to the support cylinder 84. Since the arm 21 of table 10 is attached to the upper end of support cylinder 84, that same vertical and rotational movement of the worm follower 50 will also be imparted to the equipment tray 20.

The drive means 110 for rotating the worm screw 44 includes reversible electric motor 112, pulleys 117, 126, 128, and 130, as well as corresponding belts 132 and 134. The motor 112 is a conventional, constant speed, alternating current motor with a drive shaft 113, and it is supported by motor mounts 114 secured to the cylindrical housing 42 by brackets 115. A drive pulley 117 is mounted on an extension 118 of the drive shaft 113 and is connected to a larger pulley 126 on a counter shaft 120 by a belt 132. The counter shaft 120 is journaled for rotation within a bracket 124 and it turns a smaller pulley 128. The smaller pulley 128 drives the main pulley 130 on the postioning means 40 via belt 134. The purpose of the countershaft 120 and larger and smaller pulleys 126, 128 respectively, is to impart a speed reduction and increased torque in rotating the worn screw 44 at an appropriate constant speed to efficiently move the equipment tray 20 into and out of position but not so fast as to result in jerking, shaking or spilling the equipment off the tray.

The main pulley 130 is drivingly connected to an extension 129 of the worn screw shaft 45 through an adjustable clutch mechanism as is best viewed in FIG. 7. As can be seen in FIG. 7, perhaps a little exaggerated for clarity, the main pulley 30 is axially mounted for rotation on the shaft extension 129 but not in any way connected to the shaft. In other words, the pulley 130 is slidably mounted on a shaft 129 but not keyed to the shaft. Similarly mounted on the shaft but not keyed to it, is a clutch pressure plate 136 retained in position by a retainer ring or clutch disc 138. The clutch disc 138 is keyed to the shaft or engaged thereto with a set screw 139. The main pulley 130 is biased against the clutch plate 136 by a spring 144 which is concentrically retained on the shaft extension 129 by spring keeper 146 and adjusting nut 148. The biasing force of the spring is transferred to the main pulley 130 through an interfacing spacer washer or race 142 and a ball bearing washer 140. Consequently, when the main pulley 130 is turned by belt 134, the frictional engagement of clutch plate 136 between the pulley 130 and the clutch disc 138 imparts the rotational movement to the clutch disc 138 and ultimately to the shaft 129. If however, rotation of the shaft extension 129 is prohibited, for example by contact of the worm follower 50 with the upper limit stop 60, the frictional resistance between retainer ring 138 and clutch plate 136 will be overcome thereby allowing the main pulley 130 to spin freely on the shaft extension 129 with no resultant damage to the belts or the motor. The ball bearing washer 140 turning on the race 142 prevents such spinning of the main pulley 130 from turning the spring 144 or the adjusting nut 148. A lock nut 149 can also be provided to lock the adjusting nut 148 in position by jamming the upper surface of the lock nut 149 against the lower surface of the adjusting nut 148.

The belts 134 shown in the preferred embodiment of FIG. 7 includes lugs or cogs 135; however, a common V-belt can also be used. Of course, the amount of force necessary to overcome the frictional resistance of the clutch plate 136 can be adjusted by tightening down the adjusting nut on the spring 144 to increase the bias force of the spring.

It can readily be appreciated that other types of drive means such as direct shaft connection of an axially in-line motor, adjacent gear drives, or worm gear drives can also be utilized with equal success. The arrangement shown in the preferred embodiment was chosen because of space requirements between he bottom of the positioning means 40 and the floor, as well as economy and convenience of manufacture.

The support cylinder 84 is maintained in a stable, upright position by a bushing sleeve 100 with an inside bore 102 approximately equal in diameter to the outside diameter of the supporting cylinder 84 on the upper end of the cylinder housing 42. Flanges 104 of the sleeve 100 abut against the upper edge of the housing cylinder 42, and the sleeve 100 is retained in position by set screws 106.

The mounting mechansim for arm 21 on the upper end of support cylinder 84 has been designed to provide leveling adjustment for the tray 20. An annular ring 96 is fitted around the upper rim of support cylinder 84 to broaden the effective upper surface of the rim and to provide threaded holes for the adjusting set screws 98, 99. A cylindrical-shaped leveler mounting bracket with radially extending flanges 92 on the upper end and radially flared abutment ridge 94 at the lower end is inserted axially into the upper of support cylinder 84. The flanges 92 rest on the annular ring 96 and upper end of the support cylinder 84, and the flared ridge 94 has an outside diameter approximately equal to the inside diameter of support cylinder 84 such that the flange 94 serves as a fulcrum or pivot on the lower end of the mounting bracket 90. An anchor pin 22, which is rigidly attached to the arm 21, extends downwardly through the axial bore 91 of the mounting bracket 90, and is tightly retained by nut 23 which is threadedly received on the anchor pin 22.

With the flange 94 serving as a pivot point or fulcrum, the upper or flanged end 92 of the mounting bracket 90 can be tipped either direction by successively loosening and tightening set screws 98 and 99. For example, if the tray 20 in FIG. 6 was sloping downwardly to the right, the set screw 98 could be loosened or turned out a short distance, and the set screw 99 could be successively tightened or turned in an equal distance resulting in tilting the tray 20 to a more level position. Although it cannot be seen on the cross-section of FIG. 6, there should be at least three, and ideally four, adjustable set screws equally spaced around the circumference of the annular ring 96 to provide leveling adjustment from all directions.

It is advisable that the nut 23 be snugly tightened sufficiently to impart the rotational movement of support cylinder 84 to the arm 21 and tray 20 when there is no resistance, but loose enough so that if some resistance is encountered by the swinging or rotating arm 21 or tray 20, such as by a person standing in the path of travel, the frictional engagement between the flanges 92 of mounting bracket 90 and the arm 21 will be overcome allowing slippage. This safety feature is provided in addition to the clutch drive described above since the frictional setting of the clutch necessary for efficiently driving the mechanism may be excessive for such safety purposes.

The cross-section of FIG. 6 also shows the construction of the tray 20 and its pivotal mounting to the arm 21. Specifically, the tray 20 includes an upper surface 30, a lower surface 32, and sides 34. A rotatable bearing plate 24 is immovably attached to the lower surface 32 of tray 20, and a stationary bearing plate 26 is attached to the arm 21. A bolt or king pin 27 is rigidly attached to the arm 21 and extends upwardly through the bearing plate 24 and 26 and through the lower surface 32 of tray 20. A washer 28 and a nut 29 are tightened onto the lower surface 32 of the tray. The nut 29 can be tightened sufficiently to frictionally engage and hold the tray 20 in non-movable relation to the arm 21, or it can be left loose enough to allow pivotable movement between the tray and the arm to provide an additional positioning convenience for the dentist, such as by turning the tray 20 independently of the arm 21 for better access to equipment and supplies on the tray 20 as required.

A motor cover 150 is provided to conceal the motor 112 and the drive means both for safety protection and for aesthetic purposes. The motor cover 150 is in the form of an elongated, hollow shell with a generally oval cross-sectional configuration which covers not only the motor and the drive mechanism but also the lower portion of the housing cylinder 42. On the upper end of the cover 150 and towards one side is a mounting ring 162 with an inside diameter generally conforming to the outside diameter of the housing cylinder 42, and through which the lower end of the housing cylinder 42 extends when the housing 150 is in position. Sheet metal screws 153 screwed through the mounting ring 152 and into the housing cylinder 42 retain the motor cover 150 in position. A flat access plate 154 with a turned-up circumferential rim 156 is attached to the bottom of the motor cover 150 by sheet metal screws 157 screwed through the lower extremity of the cover 150 and into the turned up rim 156. To remove the cover, the supporting arm 21 must first be detached from the supporting cylinder 84, then after removing the access plate 154 from the motor cover 150 and unscrewing the screws 153 in the mounting rim 152, the motor cover 150 can be slid upwardly and off the housing cylinder 42 to expose the motor 112 and drive means.

As has been described above, the preferred embodiment is equipped with a guide slot 68 in guide sleeve 66 configured to provide combined rotation through 90° and vertically downward movement of the tray to a position directly over the patient's chair, and then a range of travel of approximately 6 inches straight vertially downward for height adjustment of the tray over the patient. Although this range of travel has been found to provide optimum convenience for the dentist, it nevertheless is a relatively simple matter to interchange the guide sleeve 66 with a different guide sleeve having a variation of the configuration for the guide slot. For example, a guide slot could be provided which would rotate the tray through 180°, or another guide slot could be provided which allows only vertical adjustment. The only limitation on the configurations of the guide slots is that there must be a vertical component of movement at any point along the guide slot to accommodate the upward movement of the worm follower 50 as necessary to prevent binding and stoppage of the worm screw 44.

It is also recognized that the worm screw and follower mechanism for imparting vertical movement to the support cylinder can be substituted with other vertical drive means such as a hydraulically or pneumatically activated position. In that event, a suitable rotatable spindle with a radially extending guide pin would have to be interfaced between the piston and the support cylinder to impart the rotational movement to the support cylinder.

The apparatus as described lends itself particularly well to operation by a remote control circuit, for example, through a console represented at 170 which is located on the side of the chair 16 having on-off and reverse circuit connections for the reversible motor 112. If desired, the motor could also be provided with a remote control circuit allowing the operator to activate the circuit for returning the tray to the out-of-the-way position, then release his grip on the switch while the circuit remains activated until the worm follower 50 reaches the contacts the upper limit stop 60. Such a circuit could be provided in various ways such as with appropriate contact switches within the housing cylinder 42 or with a relay circuit sensitive to rotation of the worm screw 44.

Figure 8:
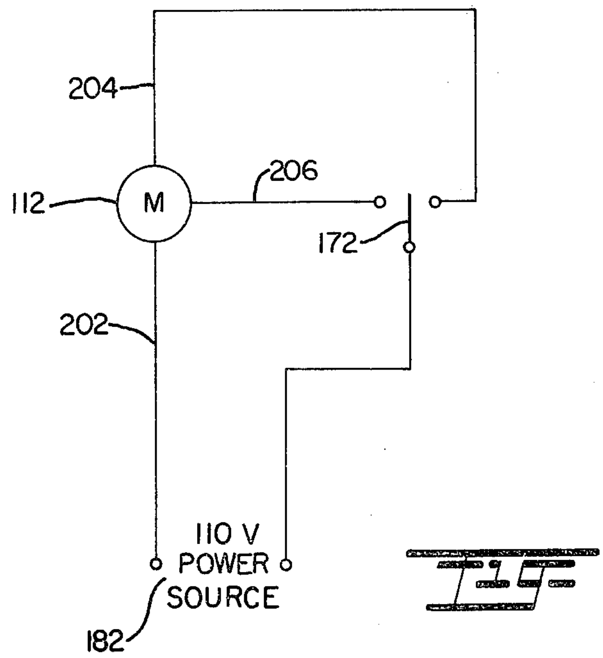

A simple on-off and reverse circuit of the former type is illustrated in FIG. 8. A 110-volt power source 182 supplies electric power to the motor 112. The lead 202 is always connected directly to the power source, but either the forward lead 204 or the reverse lead 206 can be selectively powered by the double-pole switch 172. If lead 204 is powered, the motor runs in a forward direction driving the tray downward to the use position. However, if lead 206 is powered, the fields in the motor are reversed causing the motor to turn in the opposite direction driving the tray upward to the out-of-the-way position.

Figure 9:
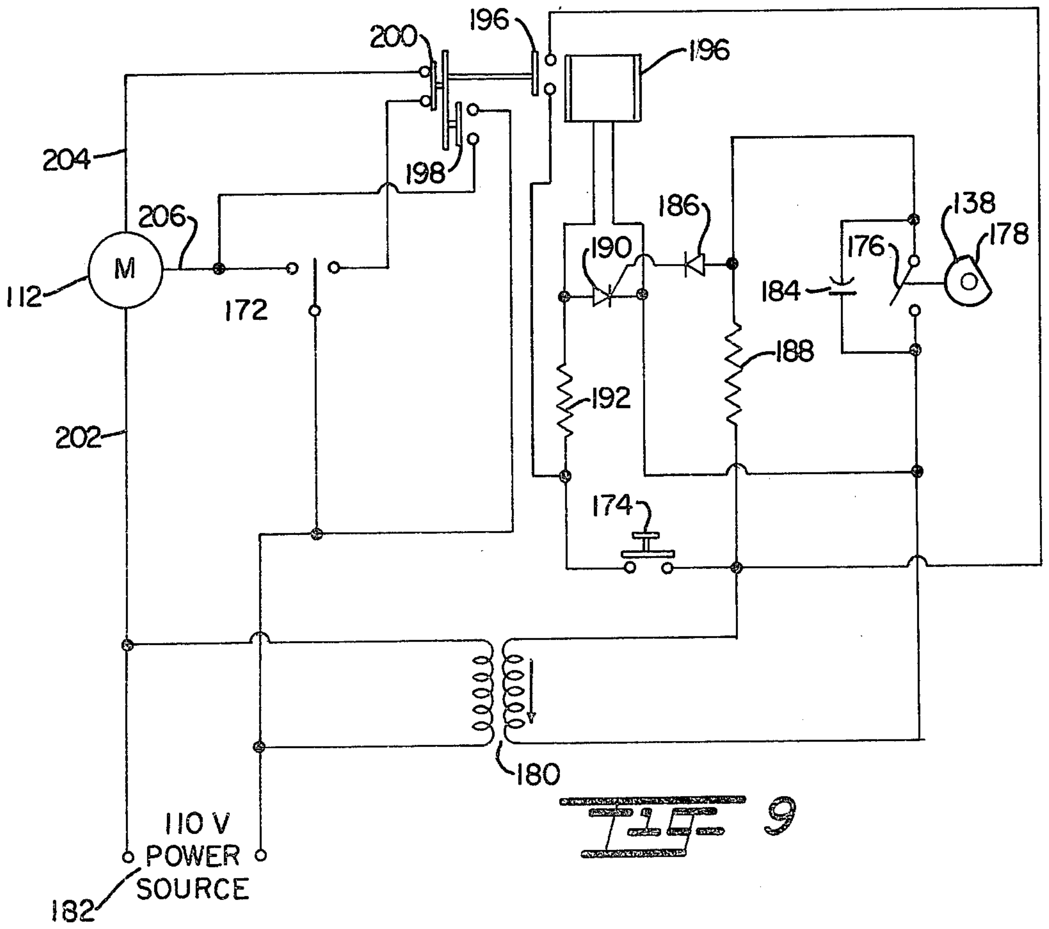

An automatic relay circuit of the latter type is shown in FIG. 9. The motor 112 is powered by a conventional 110-volt alternating current power source through primary lead 202 and either of the leads 204 or 206. When lead 204 is activated, the motor 112 runs in a forward direction driving the tray 20 downward into the use position over the patient chair. When the motor is driven through lead 206, the fields in the motor are reversed resulting in the motor running in the reversed section driving the tray 20 upwardly to the out-of-the-way position. The motor 112 can be operated in either the upward mode or the downward mode by selective use of the double-pole switch 172 which selectively activates either the downward lead 204 or the upward lead 206. Remote operation of the motor 112 through the double-pole switch 172 will enable the operator to move the tray and stop it in any position desired between the out-of-the-way position and the extreme downward position over the patient chair.

In order to save time when the dentist has finished working on this patient, he may desire to quickly activate the up mode circuit 206 and immediately leave the area or attend to other matters while the tray continues to move to the uppermost out-of-the-way position. FIG. 8 also shows a secondary circuit which allows the dentist to accomplish such an operation and which automatically deactivates the up mode circuit 206 when the tray reaches the uppermost out-of-the-way position. The secondary circuit is powered by a 24 volt DC current from a rectified transformer 180. The transformer 180 is powered from the 110-volt power source 182. A multiple-contact 12-volt relay 196 is provided in the secondary circuit for activating the up mode circuit 206 of the motor 112. A resistor 192 reduces the voltage in the 24-volt secondary circuit to 12 volts for the relay 196. When the operator wishes to activate the automatic up mode circuit, he simply depresses button switch 174 which completes the relay circuit causing the relay to complete the up mode circuit 206 through up mode contacts 198. At the same time, the relay completes a parallel relay circuit for sustaining power to the relay by closing contacts 196. With this parallel relay circuit activated through contacts 196, the button 174 can be released by the operator and the relay 196 will remain activated through the parallel circuit. Also, while the relay 196 is activated resulting in activation of the up mode circuit 206 of the motor, the down mode circuit 204 is disabled by the relay 196 by opening the contacts 200 in the relay. This disabling mechanism 200 is essentially a safety feature which prevents the down mode circuit 204 from being activated through the double-pole switch 172 at the same time the up mode circuit 206 is activated through the secondary relay circuit contacts 198, thereby eliminating any chance of overloading the circuit or blowing a fuse by such an inadvertent activation of both circuits.

An automatic stop circuit which is sensitive to the rotation of the worm screw 44 is provided with a silicon controlled rectifier 190 for interrupting the relay circuit. With the up mode circuit 206 activated, the motor 112, of course, rotates the worm screw 44 through the clutch means described above. The clutch retainer ring 138, which is also rotated by the motor 112, is provided with a flat cam surface 178 on its periphery. A cam follower microswitch 176 is alternately opened and closed with each revolution of the clutch retainer ring 138 in response to the flattened cam surface 178. The microswitch 176 completes a parallel circuit in the 24-volt secondary automatic circuit which includes a capacitor 184 and a four-layer diode 186. As long as the microswitch 176 breaks the circuit at regular intervals as dictated by the rotation of the clutch retainer ring 138, the charge in the capacitor 184 is maintained at an appropriate operating level below the threshold required to activte the four-layer diode 186. However, when the cam follower 50 contacts the upper limit stop 60 thereby prohibiting any further rotation of the worm screw 44, the bearing retainer ring 138 also stops rotating. The bearing retainer 138 is oriented so that whenever the upper limit stop 60 stops rotation of the worm screw 44, the cam follower on the microswitch 176 will be on a rounded portion of the periphery of the bering retainer 138 rather than the flat portion 178. Consequently, the microswitch 176 will remain open allowing the capacitor 184 to build up a full charge. When the voltage in that parallel circuit is build up over the threshold level determined by resistor 188, the four-layer diode 186 activates the silicon controlled rectifier 190 in the relay circuit. When the silicon controlled rectifier 190 is activated, it short-circuits or shunts the relay circuit causing the relay 196 to be deactivated. Of course, deactivation of the relay 196 breaks the circuit contacts 196 and 198 causing the motor 112 to automatically stop.

Although the present invention had been described with a certain degree of particularity, it is understood that the present disclosure has been made by way of example and that changes in details of structure may be made without departing from the spirit thereof.

What is claimed is:

1. Dental appliance stand apparatus adapted for use in conjunction with a dental patient chair, comprising a base housing and a tray extending from said housing, and tray positioning means in said housing drivingly connected to said tray for advancing said tray between a first position location directly over the chair and a second position to one side of the chair, said positioning means including a rotatable drive screw having helical flighting around its peripheral surface, drive screw follower means engaged with said helical flighting on said drive screw and being movable parallel to the longitudinal axis of said drive screw in response to rotation of said drive screw and said follower means also being rotatable and engageable with said tray for imparting motion to said tray, drive means for reversibly rotating said drive screw, and guide means associated with said follower means for imparting rotational movement to said follower means and to said tray in combination with the movement of said follower means and said tray parallel to said drive screw between the first and second positions.

2. The dental appliance stand apparatus of claim 1, wherein said guide means includes a curved guide portion with a guide track in outer spaced concentric relation to said drive screw and follower means, and a guide member extending from said follower means into engagement with said guide track wherein the longitudinal dimension of said guide track at any point along its length includes a component vector parallel to the longitudinal axis of said worm screw to allow movement of said follower means in axial relation to said drive screw when said drive screw is rotated by said drive means.

3. The dental appliance stand apparatus of claim 2, wherein said tray positioning means is disposed with the longitudinal axis of said drive screw vertically oriented and said guide track defined by a slotted hole with a first segment directed helically downward in relation to said drive screw and a second segment continuing from said first segment directed vertically downward whereby axial rotation of said drive screw in one direction starting with said tray in its uppermost position will result in initial simultaneous downward and radial rotational movement and then straight vertically downward movement of said tray in relation to said drive screw, and axial rotation of said worm screw in the opposite direction starting with said tray in its lowermost position will result in initial straight vertically upward and then simultaneous vertically upward and radial rotational movement of said tray in relation to said drive screw.

4. The dental appliance stand apparatus of claim 3, wherein said drive means includes a reversible electric motor, clutch means frictionally engaging said electric motor for positively driving said drive screw throughout normal travel of said tray but is disengageable when said guide pin reaches an end limit of travel or encounters an obstacle, and remote control means for activating and deactivating said motor in both forward and reverse modes from a remote location suitable for convenient reach by the operator.

5. The dental appliance stand apparatus of claim 3, wherein said tray positioning means includes an elongated cylindrical tube extending upwardly from said follower means, and said tray includes an arm extending laterally outward from its side, and adjustable connecting means for connecting said arm to said tube whereby the connection can be adjustably positioned for horizontally level disposition of said tray.

6. The dental appliance stand apparatus of claim 5, wherein said adjustable connecting means includes a frictionally engaged swivel joint which normally moves said tray in unison with said tube and which can slip leaving the tray in stationary position while the tube rotates in the event the path of travel of the tray is blocked by an external object.

7. The dental appliance stand apparatus of claim 6, wherein said tray is pivotally attached to said arm to allow swivel adjustment of the orientation of said tray.

8. In a dental appliance stand for supporting equipment and materials in convenient proximity to a dental chair including a housing and a tray attached to said housing wherein said tray is movable between an out-of-the-way location from the chair and a location over the chair, the combination therewith of:

an axially rotatable and longitudinally extendable and contractable main cylinder extending vertically upward from said housing;

attachment means for adjustably attaching said tray to the upper extremity of said cylinder;

extension means for imparting longitudinal movement to said main cylinder; and a stationary guide cylinder concentric with and radially spaced in outwardly encompassing relation to said main cylinder with guide means therein for translating vertical movement of said main cylinder into rotational movement, said guide means including an elongated slot in said guide cylinder at least a portion of which is disposed in a generally helical path around said main cylinder and a guide pin immovably attached to said main cylinder and extending radially into engagement with said slot.

9. The dental appliance stand of claim 8 wherein said extension means includes a vertical worm screw journaled in said housing in axial alignment with said main cylinder, a worm follower concentric with and threadedly engaged with said worm screw and slidably disposed in said housing, said guide pin being rigidly attached to and extending radially from said follower into sliding engagement with said slotted hole, and reversible drive means connected to said screw for axially rotating said worm screw in either direction, whereby axial rotation of said worm screw in one direction drives said follower upward and rotation in the opposite direction drives said follower downward, and wherein said follower is immovably connected to the bottom of said main cylinder such that any movement of said follower results in corresponding movement of said main cylinder.

10. The dental appliance stand of claim 9, including an adjustable limit stop removably attached to to the upper end of said worm screw for limiting the extent of the upward movement of said worm follower along said worm gear.

11. The dental appliance stand of claim 8, wherein a support arm extends laterally from said tray, and said attachment means includes a cylindrical sleeve with a flared ridge on its lower end inserted into the upper end of said main cylinder, the outside diameter of said flared ridge being approximately the same as the inside diameter of said main cylinder, radially adjustable set screws threaded through said main cylinder above the position of said flared ridge, a pin rigidly attached to and extending downward from said arm and axially through said sleeve, and a nut threadedly received on said pin for snugly retaining said pin in said sleeve.

12. The dental appliance stand of claim 8, wherein said stationary guide cylinder is removable and interchangeable with other comparably sized and shaped guide cylinders having differently configured guide means for imparting different paths of travel to said tray.

* * * * *

UNITED STATES PATENT OFFICE
CERTIFICATE OF CORRECTION

Patent No. 4,126,939 Dated November 28, 1978

Inventor(s) Charles J. Pyne, Jr.

It is certified that error appears in the above-identified patent and that said Letters Patent are hereby corrected as shown below:

Column 4, line 9, cancel "should" and substitute -- shoulder --.

Column 4, line 51, after "second," add -- it --.

Column 4, line 56, cancel "configuratiion" and substitute -- configuration --.

Column 5, line 42, cancel "worn" and substitute -- worm --.

Column 5, line 48, cancel "worn" and substitute -- worm --.

Column 6, line 27, cancel "he" and substitute -- the --.

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*